(12) United States Patent
Audet et al.

(10) Patent No.: US 12,377,546 B2
(45) Date of Patent: Aug. 5, 2025

(54) SYSTEM AND METHOD FOR AUTOMATICALLY SORTING AND COMBINING BOARD PIECES

(71) Applicants: MEKANIKA INC., Sainte-Marie (CA); PRO-AUTOMATION INC., Saint-Augustin-de-Desmaures (CA)

(72) Inventors: Richard Audet, Sainte-Marie (CA); Simon Kirouac, Saint-Augustin-de-Desmaures (CA)

(73) Assignees: MEKANIKA INC., Sainte-Marie (CA); PRO-AUTOMATION INC., Saint-Augustin-de-Desmaures (CA)

( * ) Notice: Subject to any disclaimer, the term of this patent is extended or adjusted under 35 U.S.C. 154(b) by 855 days.

(21) Appl. No.: 17/456,543

(22) Filed: Nov. 24, 2021

(65) Prior Publication Data
US 2022/0161436 A1 May 26, 2022

Related U.S. Application Data

(60) Provisional application No. 63/117,805, filed on Nov. 24, 2020.

(51) Int. Cl.
*B25J 9/16* (2006.01)
*B07C 5/14* (2006.01)
(Continued)

(52) U.S. Cl.
CPC .............. *B25J 9/1687* (2013.01); *B07C 5/14* (2013.01); *B25J 5/02* (2013.01); *B25J 9/0084* (2013.01);
(Continued)

(58) Field of Classification Search
CPC . B25J 9/1687; B25J 5/02; B25J 9/0084; B25J 9/0093; B25J 15/00; B25J 15/0293;
(Continued)

(56) References Cited

U.S. PATENT DOCUMENTS

| 4,947,978 A * | 8/1990 | Rhodes | B65G 47/261 198/341.02 |
| 6,598,747 B1 * | 7/2003 | Ahrens | B65G 61/00 700/223 |

(Continued)

FOREIGN PATENT DOCUMENTS

| JP | 2002200606 A | * | 7/2002 |
| JP | 2004160667 A | * | 6/2004 |
| TW | 201707840 A | * | 3/2017 |

OTHER PUBLICATIONS

Yamamoto Taiji, JP 2002200606 (Year: 2002).*
Wang, et al., TW 201707840 (Year: 2017).*
JP-2004160667-A (Year: 2004).*

*Primary Examiner* — Ernesto A Suarez
*Assistant Examiner* — Laurence R Brothers
(74) *Attorney, Agent, or Firm* — Brouillette Legal Inc.; Philippe Brouillette

(57) ABSTRACT

A sorting and combining system for board pieces is provided by the present invention. The system comprises a conveying system for the board pieces in association with at least one robotic arm and accumulating rows. The system may further comprise side rows for additional storing of board pieces. With the help of stopping systems, board pieces of the conveyor are assembled into stacks of predetermined length by the at least one robotic arm on the accumulating rows before being sent to an outfeed section. A method is further provided, the method analyzing the presence of board pieces on a conveyor, stopping gates and a reserve in order to complete stacks of rows of predetermined length on sorting boxes. The method makes the use of a robotic arm for the manipulation and displacement of board pieces.

29 Claims, 14 Drawing Sheets

(51) Int. Cl.
*B25J 5/02* (2006.01)
*B25J 9/00* (2006.01)
*B25J 15/00* (2006.01)
*B65G 1/04* (2006.01)
*B65G 1/137* (2006.01)
*B65G 47/08* (2006.01)
*B65G 15/02* (2006.01)
*B65G 15/10* (2006.01)
*B65G 15/58* (2006.01)
*B65G 61/00* (2006.01)

(52) U.S. Cl.
CPC .......... *B25J 9/0093* (2013.01); *B65G 1/0464* (2013.01); *B65G 1/1371* (2013.01); *B65G 47/082* (2013.01); *B07C 2501/0063* (2013.01); *B25J 15/00* (2013.01); *B65G 2201/0217* (2013.01); *B65G 2201/0282* (2013.01); *B65G 2203/0208* (2013.01)

(58) Field of Classification Search
CPC ..... B07C 5/14; B07C 2501/0063; B07C 5/36; B65G 1/0464; B65G 1/1371; B65G 2201/0217; B65G 2201/0282; B65G 2203/0208; B65G 15/10; B65G 15/58; B65G 61/00; B65G 47/082
See application file for complete search history.

(56) References Cited

U.S. PATENT DOCUMENTS

2005/0161118 A1\* 7/2005 Carman ............. G01N 21/8986
144/403
2017/0282634 A1\* 10/2017 Jones ....................... B65H 5/08

\* cited by examiner

SYSTEM AND METHOD FOR AUTOMATICALLY SORTING AND COMBINING BOARD PIECES

REFERENCE TO RELATED APPLICATIONS

The present patent application claims the benefits of priority of U.S. Provisional Patent Application No. 63/117,805, entitled "SYSTEM AND METHOD FOR AUTOMATICALLY SORTING AND COMBINING BOARD PIECES" and filed at the United States Patent and Trademark Office on Nov. 24, 2020, the content of which is incorporated herein by reference.

FIELD OF THE INVENTION

The present invention generally relates to the field of systems for sorting and packaging board pieces. More particularly, the present invention relates to the field of systems and methods for automatically sorting and combining hardwood flooring pieces having different lengths.

BACKGROUND OF THE INVENTION

When manufacturing hardwood flooring pieces, the pieces are typically cut in different lengths. The pieces having different lengths are combined to form a row having a combined length fitting in predetermined packaging. The sorting and combining has conventionally been performed manually. A worker picks up pieces as they are conveyed and combines them to form a predetermined length fitting in the desired package.

In other configurations, semi-automated processes comprise having a conveyor moving a plurality of unevenly sized hardwood pieces and having workers manually sorting said hardwood pieces into rows of an approximate desired length. The pieces may be picked during displacement on the conveyor or the conveyor may be stopped for pickup. One of the drawbacks of such process is the increased risk of accidents for workers as they are in direct contact with heavy machinery having moving parts. Further drawback is that a worker can only be so good as to visually and manually sort through a vast, and often moving, number of parts without producing errors. Yet, picking of parts may be non-optimal and may increases losses due to the correction of the mistake or even the non-correction of the mistake.

Some prior art systems are automated systems adapted to sort and to combine board pieces. Such systems generally comprise combining rows adapted for the moving boards to be slid on. An important drawback associated with such type of system is that in order to avoid bottlenecks when sorting the boards, the space and quantity of side conveying rows is often directly linked to the desired efficiency.

For example, U.S. Pat. No. 6,598,747 discloses a sorting system for planks having a plurality of canals for the displacement and sorting of said planks. If a plank is in the wrong canal, there is no mechanism to properly place it other than wait to drop it at an outfeed assembly line. Understandably, the system may easily get clogged when sorting planks. Furthermore, adding more canals is space demanding and is thus a solution to avoid.

There is thus a clear need for a system of sorting and combining board pieces into stacks of predetermined length that does not, or at least minimally, require manpower and that efficiently sort boards using an optimal combining area.

SUMMARY OF THE INVENTION

The aforesaid and other objectives of the present invention are realized by generally providing a system for sorting and combining board pieces, the system comprising, a conveying system for moving board pieces, an accumulation system for receiving a plurality of the board pieces, the accumulation system comprising a row and being configured to move the received board pieces to the conveying system, and a robotic arm configured to: pick one or more of the board pieces on the conveying system; move the one or more picked board pieces to the row of the accumulation system, wherein the board pieces present on the accumulation system are moved to the conveying system when a total length of the board pieces of the row corresponds to a predetermined length.

In one aspect of the invention, the accumulation system may be above and across the conveying system. The accumulation system may comprise a plurality of rows. The rows may be substantially parallel to one another and being substantially perpendicular to the conveying system. The accumulation system may comprise a pivoting mechanism to pivot at least one of the rows to move the board pieces to the conveying system. The rows may comprise a plurality of tabs. Each of the tabs may be distanced from the other tabs and wherein the tabs support the board pieces during movement of the rows. The tabs may be moveable under a top surface of the conveying system. The robotic arm may pick the board pieces from side surfaces of the board pieces only.

In another aspect of the invention, the system may further comprise a frame over the conveying system, the robotic arm being attached to the frame. The robotic arm may be moveable along the width of the conveying system. The robotic arm may be slidably mounted to the frame. The robotic arm may have a plurality of degrees of rotation to manipulate the boards present at heights and positions within reach of the robotic arm. The robotic arm may have a universal gripper comprising a suction element. The system may further comprise a reserve accumulation system within reach of the robotic arm. The reserve accumulation system may comprise a plurality of reserve rows. The reserve rows may be at an angle. The reserve accumulation system may be on a longitudinal side of the system. The robotic arm may be configured to pick a board piece from the reserve accumulation system and to move the picked-up board to the accumulation system.

In one aspect of the invention, the system may further comprise sensors for measuring the length of the board pieces. The system may further comprise sensors for verifying the position of the board pieces. The system may comprise a second robotic arm and a second accumulating system. The second robotic arm and the second accumulating system may be across the conveying system and being downstream from the first robotic arm. The first accumulating system may be configured to move all the boards present on the first accumulating system to the conveying system. The system may further comprise: a controller configured to control movements and manipulations of the robotic arm and trigger the release of board pieces from the row to the conveying system.

In yet another aspect of the invention, a system for sorting and combining board pieces is provided, the system comprising: a conveying system for moving board pieces, and at least two sorting and combining stations, each of the sorting and combining stations comprising: an accumulation system for receiving a plurality of the board pieces, the accumulation system comprising a row and being configured to move the received board pieces to the conveying system, and a robotic arm configured to: pick one or more of the board pieces on the conveying system, move the one or more picked board pieces to the row of the accumulation system, wherein the board pieces present on the accumulation system are moved to the conveying system when a total length of the board pieces of the row corresponds to a predetermined length. The system may further comprise a controller configured to control movements and manipulations of the robotic arm and trigger the release of board pieces from the row to the conveying system.

In one aspect of the invention, a method for sorting and combining of board pieces is provided, the method comprising: detecting physical characteristics of a conveyed board piece, using a robotized arm to pick the detected board piece, stocking the picked board piece with other stocked board pieces based on the detected physical characteristics, and repeating the detection, picking and stocking of the picked board to form a row of boards having a predetermined length.

In another aspect of the invention, the method may further comprise: releasing and conveying all of the stocked board pieces, and using a second robotized arm to pick the released and conveyed board pieces. The method may further comprise: storing the detected physical characteristics of each board in a memory array representing the stocked rows of board pieces, and using the memory array to determine a position in one of the rows to stock a picked board piece. The method may further comprise: computing a probability to form rows of board pieces having the predetermined length using the detected characteristics of the board pieces in the memory array, selecting rows having the computed probability higher than or equal to a predetermined value, and stocking the board pieces the selected rows. The method may further comprise: allocating a validation priority for each of the board pieces in the memory array based on the location of the stocked board pieces. The method may further comprise stocking the board pieces having a computed probability lower than or equal to the predetermined value. The method may further comprise the robotic arm moving one of the stocked board pieces to another row of stocked board pieces.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE INVENTION

A novel system and method for sorting and combining board pieces will be described hereinafter. Although the invention is described in terms of specific illustrative embodiment(s), it is to be understood that the embodiment(s) described herein are by way of example only and that the scope of the invention is not intended to be limited thereby. Accordingly, the system and method may be used for combining and sorting varying types of pieces and is not limited to boards and/or hardwood flooring tiles.

Figure 1:
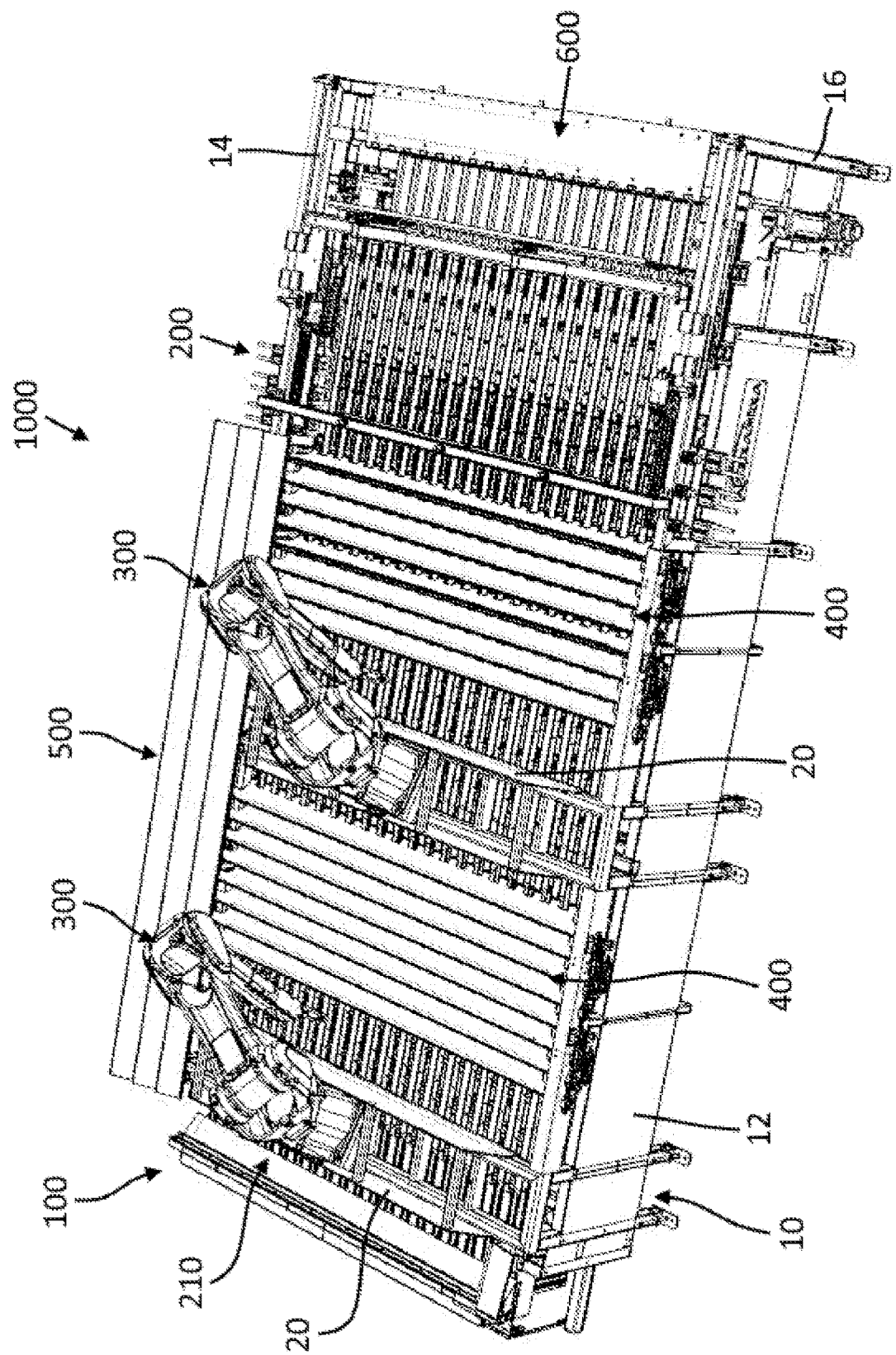
FIG. 1 is a perspective view of an embodiment of a sorting and combining system in accordance with the principles of the present invention.

Now referring to FIG. 1, an embodiment of the sorting and combining system 1000 is illustrated. The system 1000, also interchangeably referred to an apparatus or a device, comprises a conveyor 200, at least one robotic arm 300, at least one main combining system 400. In some embodiments, the system 1000 may further comprise an infeed system 100 and/or an outfeed system 600.

In some embodiments, the system 1000 comprises a frame 10 adapted to hold together the abovementioned systems. Understandably, the frame 10 may be shaped or adapted to fit within available space for the apparatus 1000 itself and/or the other systems and devices connected to the said system.

Broadly, the system 1000 is adapted to convey a board toward or under the robotic arm 300. The board is measured to determine its length, such as by using measurement sensors. The presence of the board is detected near the robotic arm 300 which triggers the robotic arm 300 to pick up the board on the conveyor 200. A processor or computer is configured to store the status of each row of the combining system 400. By associating in memory each length of a board present on a row 410, the presence of boards on rows is mapped in memory. The robotic arm 300 is programmed to position the picked-up board on a row 410 having enough free area to receive the measured board and to limit the total length of the boards present on the row 410 to a maximum predetermined length, typically dictated by the size of the packaging. When a row 410 comprises boards having a combined length of the packaging or within a predetermined range, the row 410 releases the boards on the conveyor 200 to be moved toward an exit of the system 1000 or toward an outfeed system 600.

In the embodiment shown at FIG. 1, the main frame 10 comprises two substantially parallel vertical side walls panels (12 and 14) supported by a plurality of beams 16. The beams 16 generally form the structure of the frame 10. The beams 16, which are generally located between both side walls (12 and 14), are typically arranged to support the varying systems and components of the apparatus 1000. The main frame 10 may be made of any known rigid material, such as steel, aluminum, alloy and/or any other metal or rigid material.

Still referring to FIG. 1, the optional infeed system 100 is configured to feed board pieces of varying length into a feeding area 210 of the conveyor 200. The boards may be fed to the feeding area of the conveyor 200 using any method or system known in the art. As shown in FIG. 1, the feeding area 210 is typically located on one side of the conveyor. Understandably, any other known method to feed the boards to the conveyor 200 may be used within the scope of the present disclosure. In the illustrative embodiment of FIG. 1, the boards are fed on the conveyor 200 substantially perpendicular to the length of the said conveyor 200.

In some embodiments, the infeed system 100 may automatically feed a board or piece on the conveyor 200 once the previously provided board has been moved away from the feeding area 210. In another embodiment, the infeed system 100 may be configured to feed multiple boards at the same time to the feeding area 210. The board pieces may be fed on the conveyor 200 using any known method in the art, such as being slid or dropped onto the surface of the conveyor.

Figure 2:
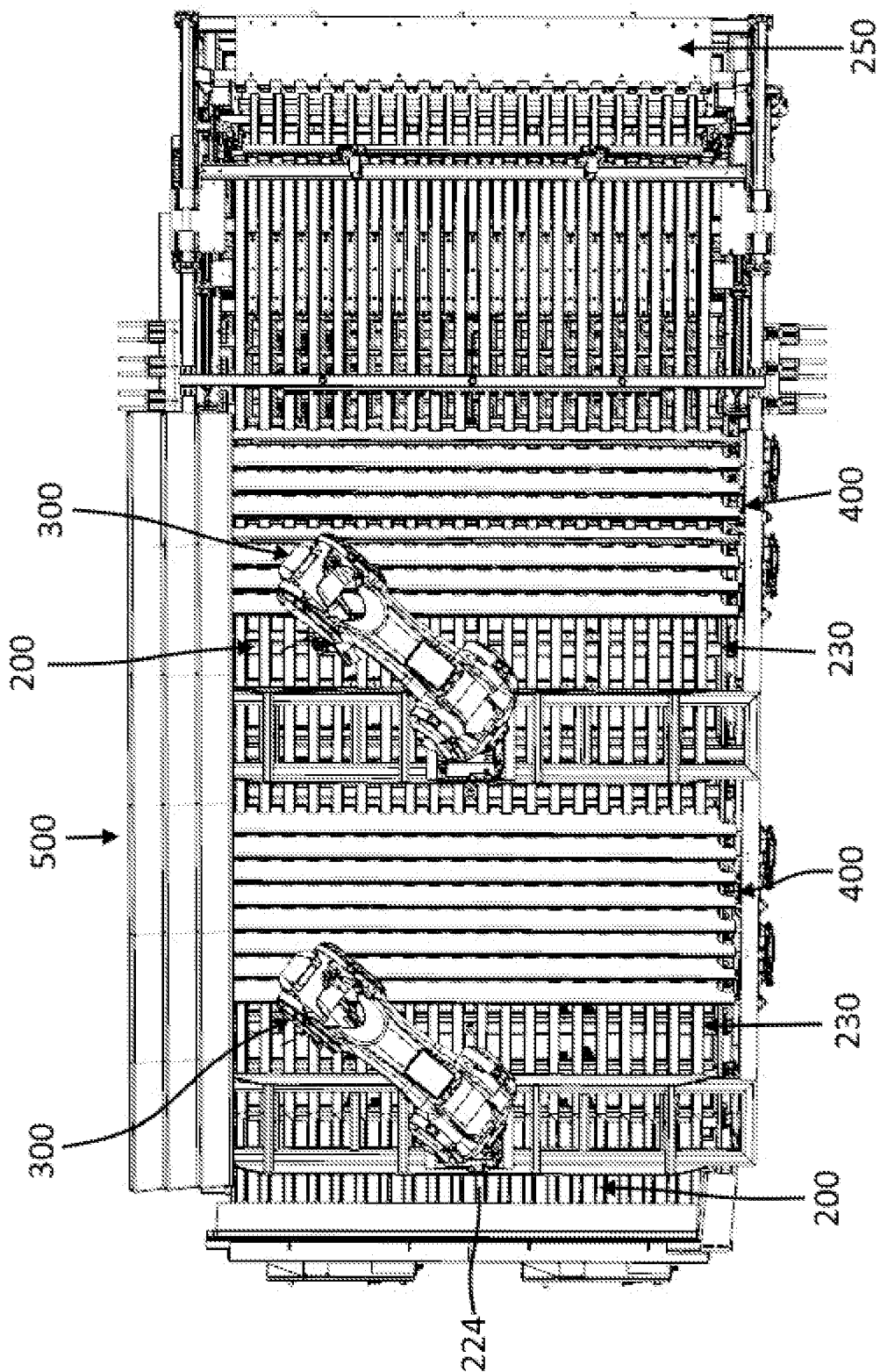
FIG. 2 is a top plan view of the sorting and combining system of FIG. 1.
Figure 3:
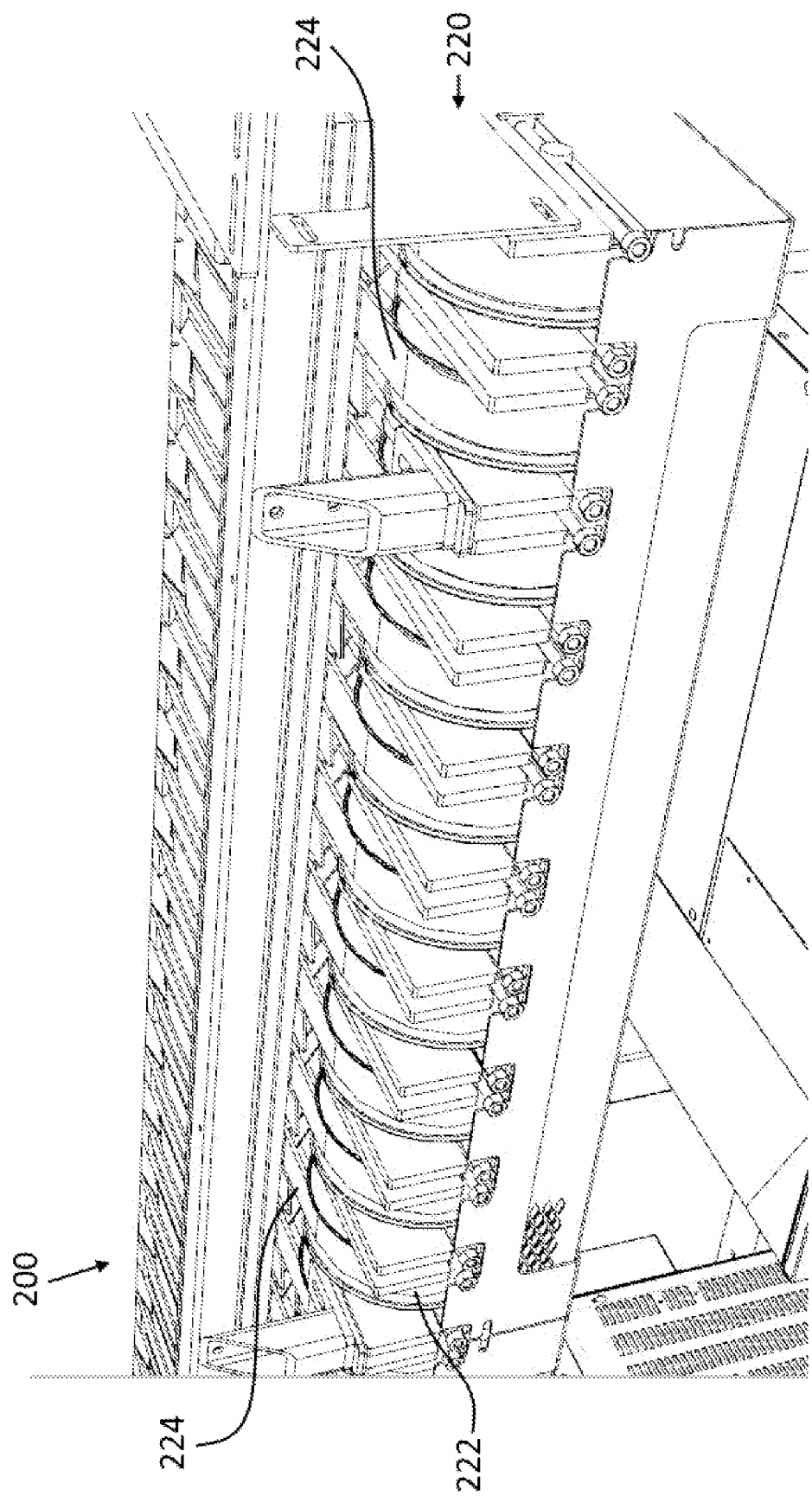
FIG. 3 is a partial perspective view of a conveyor installed on a sorting and combining system in accordance with an aspect of the invention.

Now referring to FIGS. 2 and 3, the conveyor 200 is illustrated. Understandably, any conveying means may be used within the scope of the present invention. In the illustrated embodiment, the conveyor 200 comprises a plurality of conveyor band mechanisms 220. Each conveyor band mechanism 220 comprises one or more idling wheel 222 and at least a drive wheel, not shown, pivotally attached to the frame 10. The mechanism 220 further comprises an endless band 224. The endless band 224 surrounds and engages the idling 222 and drive wheels. The conveyor band mechanisms 220 are typically laterally spaced apart along the width of the conveyor 200.

In some embodiments, the conveyor 200 comprises a plurality of idling wheels 222 spaced along the length of the endless band 224. In another embodiment, the conveyor 200 comprises sprocket wheels 222 partially or totally spanning the width of the conveyor 200 (not shown). In such an embodiment, the conveyor 200 may comprise evenly spaced-apart endless bands 224 or may comprise a single endless band 224 spanning the width of the sprocket wheel 222.

In embodiments having a plurality of endless bands 224, the endless bands 224 are typically spaced apart from another along the width of the conveyor 200. The spacing between each of the endless bands 224 generally aims at avoiding boards falling in the spacing between the endless bands 224. Understandably, any type of conveying system to convey boards from an entry 210 to an exit area 250 known in the art may be used within the scope of the present invention.

In yet another embodiment, endless bands may be made of rubber or any other material, such as sections of metal plates. The width of conveyor 200 is generally wider or equal to the length of predetermined packages of boards.

Figure 4:
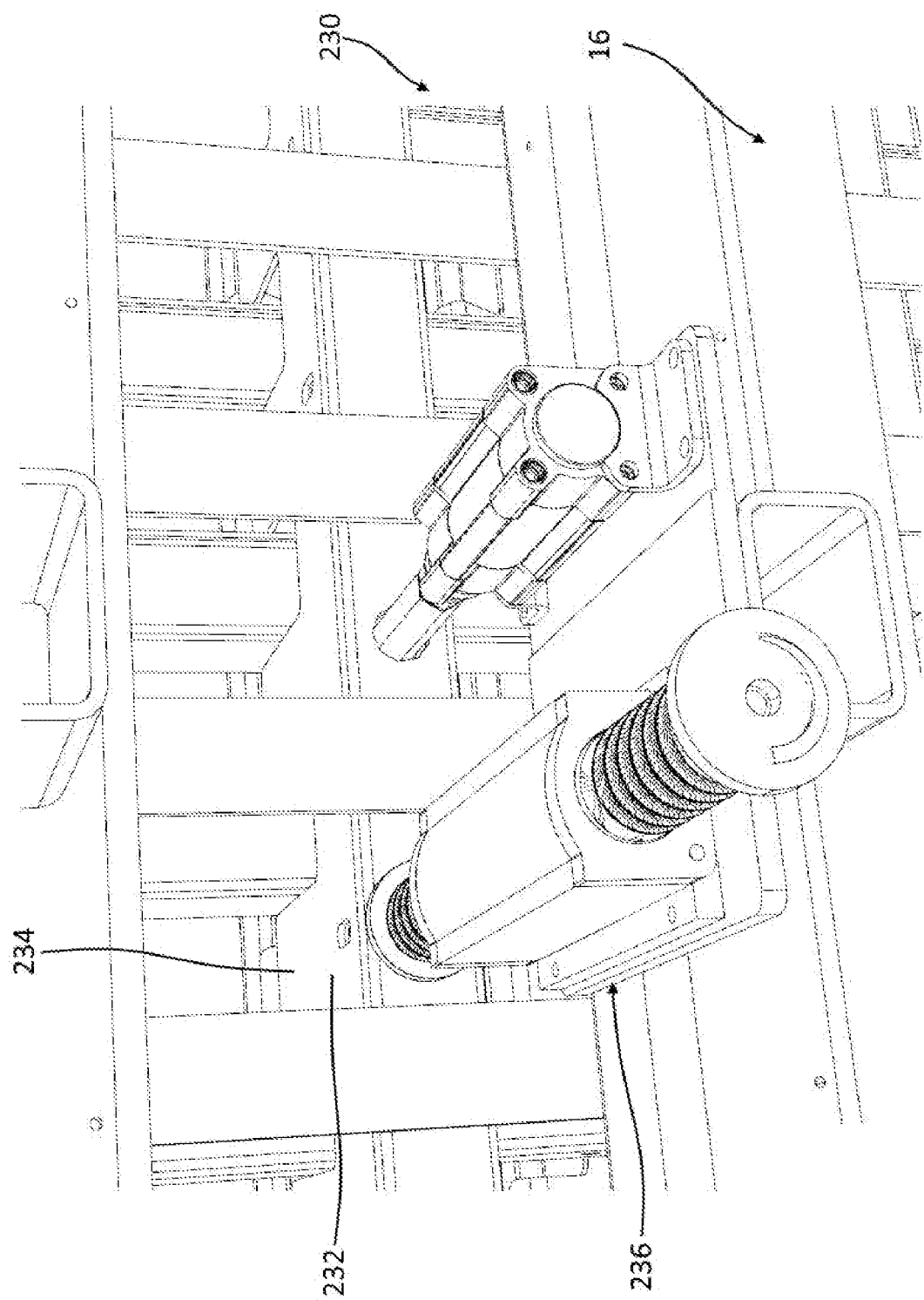
FIG. 4 is a partial perspective view of a stopping system installed on a sorting and combining system in accordance with an aspect of the invention.

Now referring to FIG. 4, an embodiment of board stopping system 230 of the conveying system 200 is illustrated. The stopping system 230 is configured to stop conveying or moving the boards along the length of the conveyor 200. In such an embodiment, the stopping system 230, also referred to as grip gates, comprises fences 232. The fences 232 are preferably located under the conveyor 200. In some embodiments, the fences 232 comprise tabs 234 or thinner portions.

The tabs 234 generally allow the fence 232 to be positioned between the conveyor band mechanisms 220. The stopping system 230 further comprises a triggering device 236 adapted to resiliently raise or lower the fences 232. The triggering device 236 may be embodied as pneumatic or electro mechanical systems 236.

When lowered, the fences 232 clear the top surface of the conveyor 200, thus allowing free movement of the boards on the conveyor 200. When raised, the fences 232 protrude or extend over the top surface of the conveyor, thus physically blocking movement of the boards by the conveyor 200. It may be appreciated that the plurality of fences 232 may be located at convenient lengthwise locations along the length of the conveyor 200 to provide stopping functionality at different locations on the system 1000.

As an example, in some embodiments, the stopping system 230 is positioned at a location being downstream and in range of a robotic arm 300. In such an embodiment, the board may be stopped on the conveyor 200 to be picked up and manipulated by the robotic arm 300. In yet other embodiments, the stopping system 230 may be used for stopping or slowing down the displacement of boards on the conveyor 200.

In an exemplary embodiment, the stopping system 230 may comprise a surface with increased friction (not shown), the surface being located between each of the conveyor band mechanisms 220. By adjusting the elevation of the high grip surface, the conveyed boards may be slowed down by friction created by the conveyor 200. The said created friction may slow down or entirely stop the movement of the boards.

The system 1000 may further comprise sensors 240 having different functions. The sensors 240 may be installed at different locations along the conveyor 200.

In some embodiments, the system 1000 comprises movement detection or presence detection sensors 240, such as optical or infrared red sensors. Such sensors 240 are typically installed to detect presence of boards on the top surface of the conveyor 200. In some embodiments, the system 1000 comprises weight sensors configured to detect weight over the conveyor 200. A variation in weight may be used to detect presence of one or more boards at a specific location on the conveyor 200. In yet another embodiment, the system 1000 may comprise presence or weight sensors 240 on the combining rows 400 and/or on the side combining rows 500. It is to be understood that sensors 240 may be in communication with other systems of the device, such as but not limited to the stopping systems 230, the controller (not shown) and the robotic arms 300.

Figure 5:
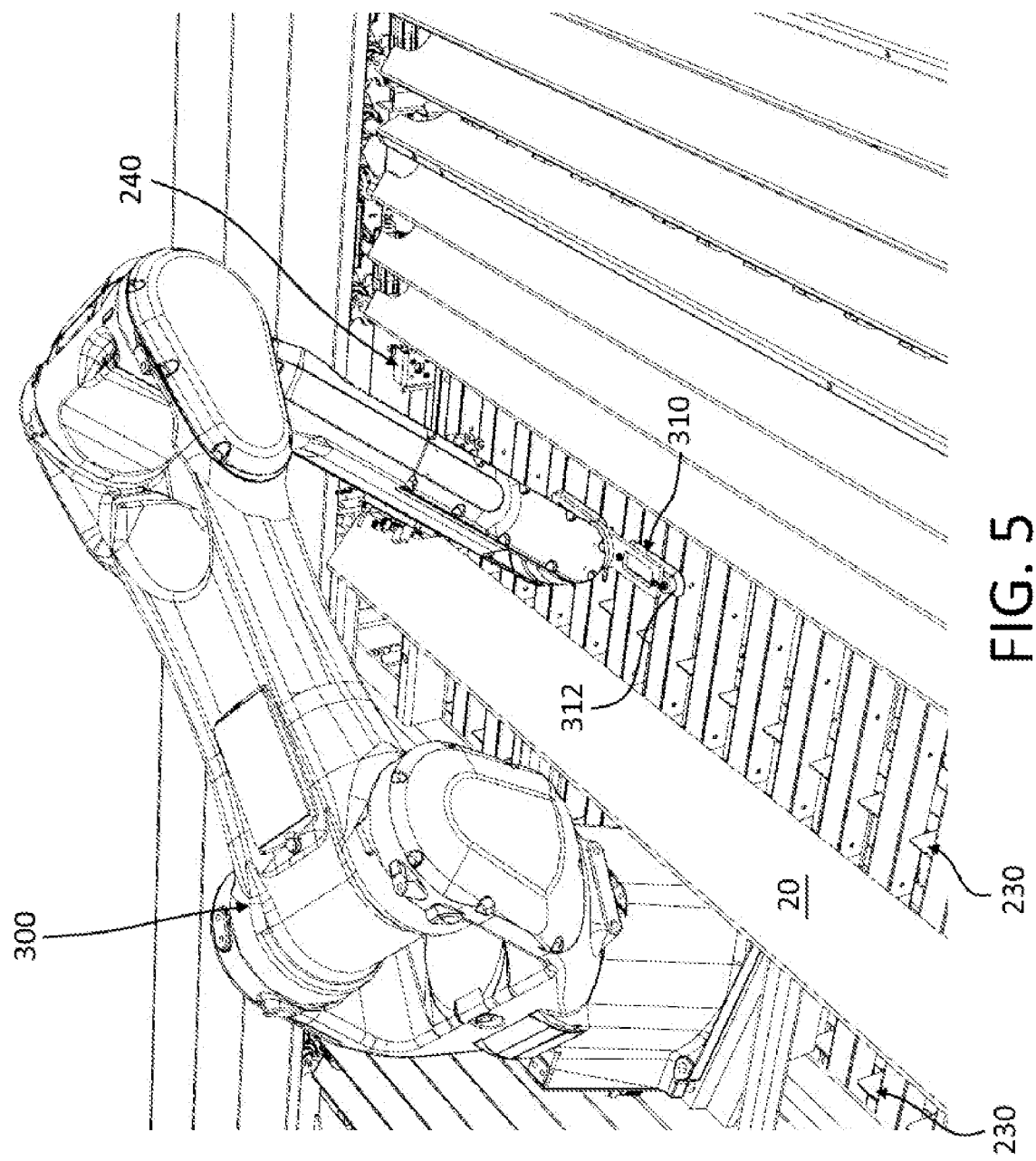
FIG. 5 is a partial perspective view the sorting and combining system of FIG. 1 showing a robotic arm configured to pick a wood piece on a conveyor.

Now referring to FIG. 5, the system 1000 with a robotic arm 300 is shown. The robotic arm 300 is disposed along the length of the conveyor 200. In some embodiments, the system 1000 may comprise two robotics arms 300. The system 1000 may comprise a secondary frame 20 adapted to receive the robotic arm 300. The secondary frame 20 is typically supported by the frame 10 and extends over the conveyor 200. The secondary frame 20 provides enough height to allow boards to pass under the secondary frame 20 and the robotic arm 300. In the illustrated embodiment, the secondary frame 20 is supported by the side walls (12 and 14) of the main frame 10. Understandably, any other mechanism or method to support the robotic arm over the conveyor 200 may be used within the scope of the present invention.

In some embodiments, the robotic arm 300 may be movable along the width of the frame 10 or of the conveyor 200. In some embodiments, the secondary frame 20 comprises a slot allowing the robotic arm 300 to slide along the width of the frame 10. In such embodiments, the robotic arm 300 has additional range of motion along the width of the conveyor 200 and may provide additional reach outside of the frame's 10 top area.

In some embodiments, the system comprises two robotic arms 300. In such embodiments, both robotic arms 300 are supported over the conveyor 200 along the length of the conveyor 200. The robotic arms 300 may be embodied as any robotic arm apparatus having a plurality of degrees of rotations and a range sufficient enough to manipulate boards located at varying heights and positions around the robotic arm 300. The robotic arms 300 comprise a device to pick, manipulate and/or grip 310 boards of various sizes. In the illustrated embodiment, the arm comprises universal grippers 310 comprising a suction element 312 adapted to stick to a top surface of a board. Understandably, any other known mechanism for picking, manipulating and/or gripping of the board may be used, such as but not limited to suction cups, clamps, robotized hand, magnets or any other gripping means.

Figure 11:
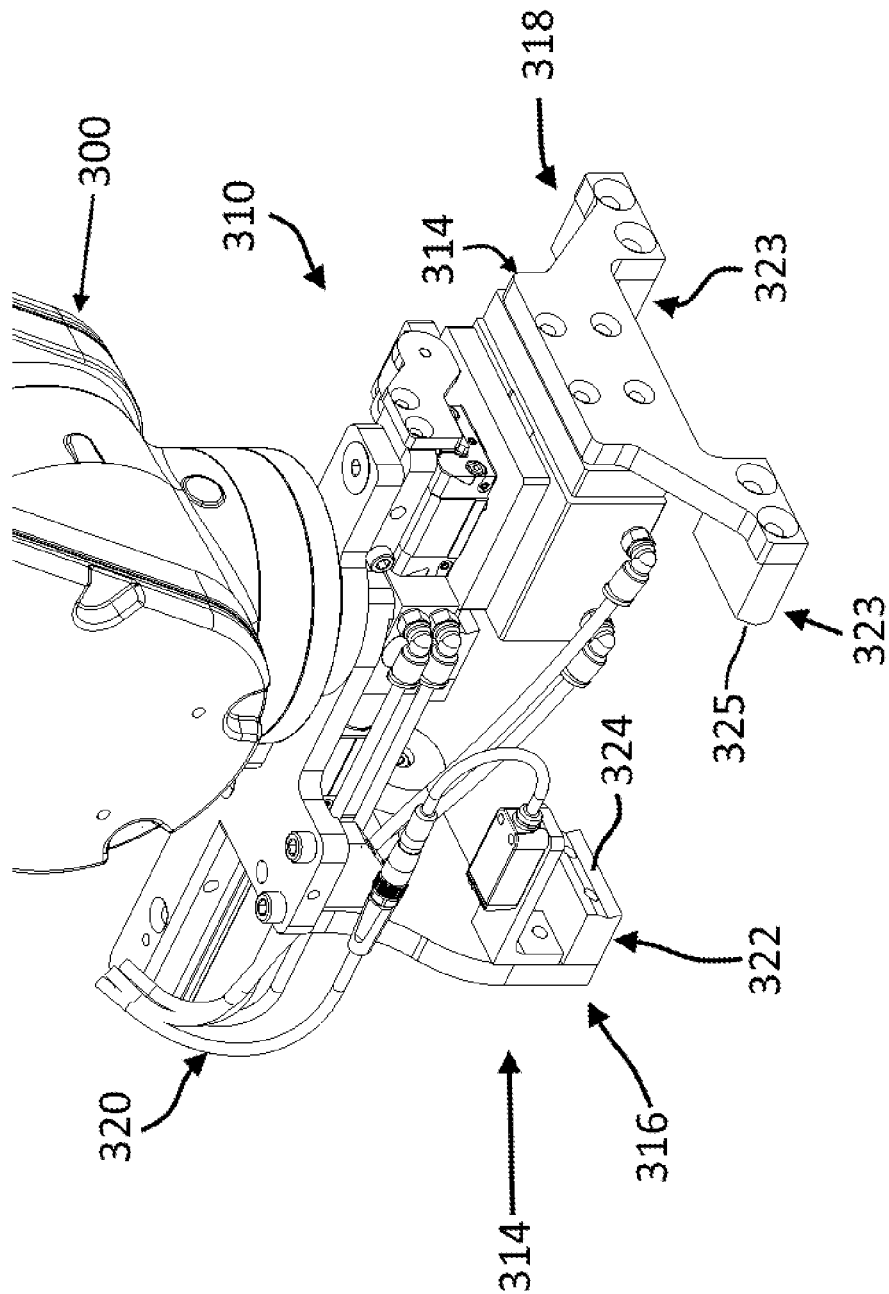
FIG. 11 is a front perspective view of an embodiment of a device for picking, gripping and manipulating a board piece in accordance with the principles of the present invention.
Figure 12:
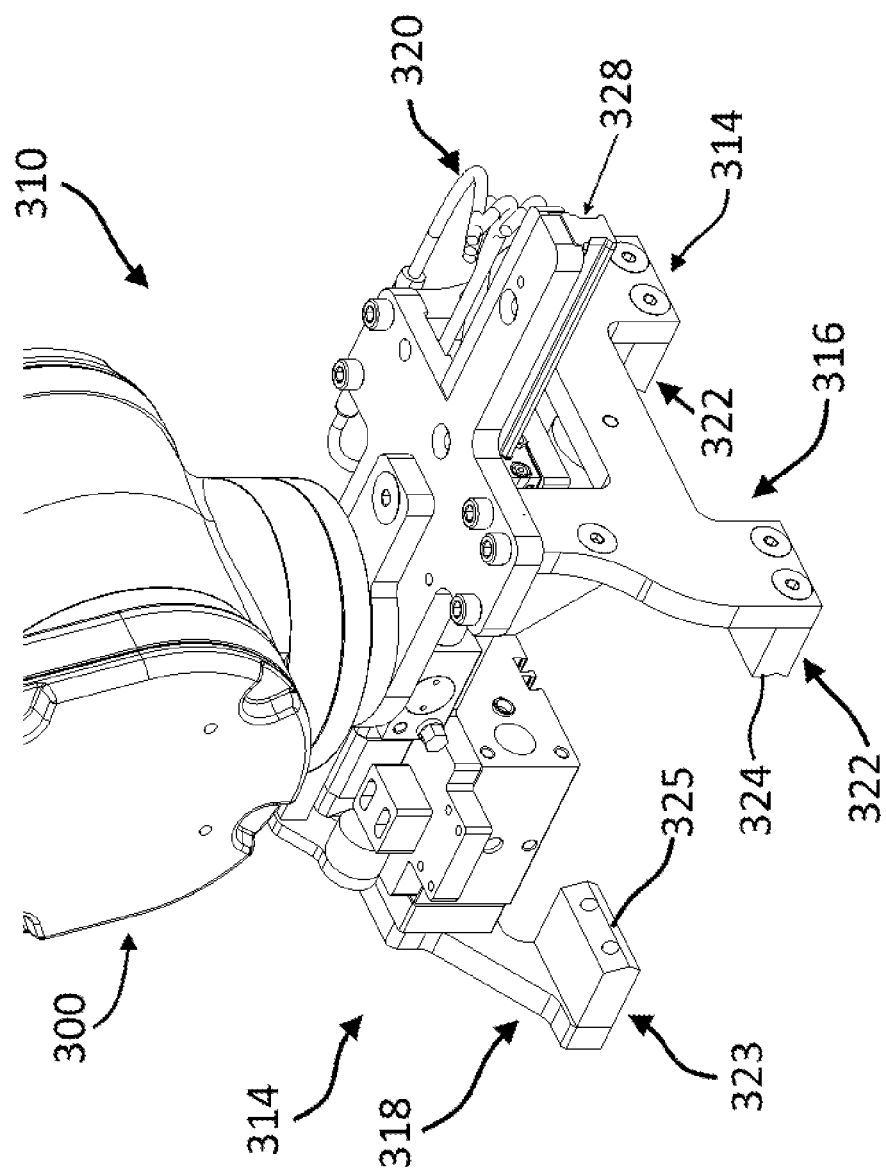
FIG. 12 is a rear perspective view of the device for picking, gripping and manipulating a board piece of FIG. 11.
Figure 13:
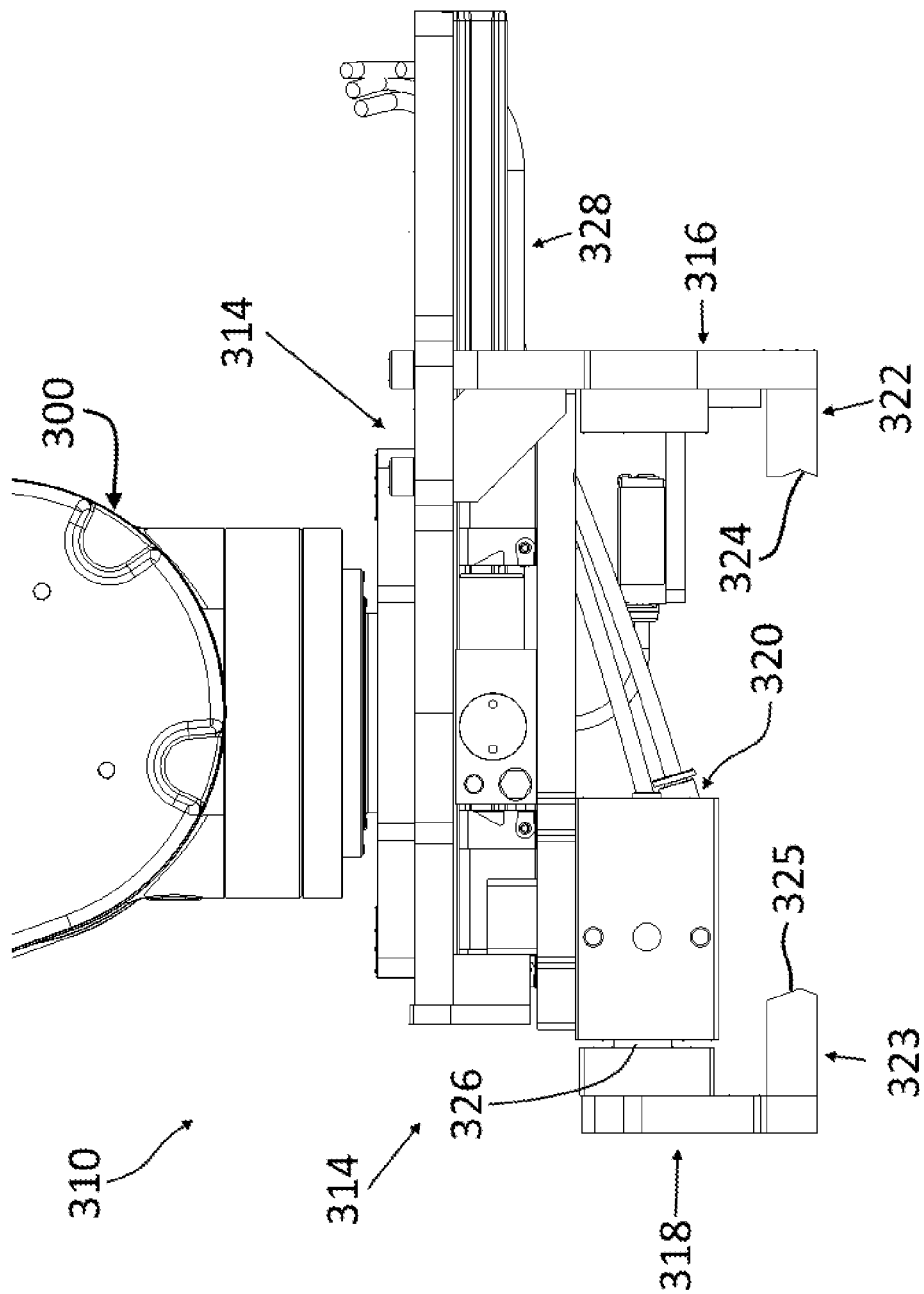
FIG. 13 is a rear elevation view of the device for picking, gripping and manipulating a board piece of FIG. 11.

Referring to FIGS. 11 to 13, an embodiment of a device to pick, manipulate and grip 310 boards is shown. The embodied device 310 is attached to the robotic arm 300 and comprises side gripping assemblies 314 adapted to grip or squeeze sides of a board. In such embodiment, the gripping assemblies 314 are generally facing one another. The side gripping assemblies are typically attached to a body 330 of the device 310

In the illustrated embodiment, each side gripping assembly 314 comprises a side gripper 316, 318. Each side gripper 316, 318 is moveable away from and toward the other side gripper 318, 316. The side grippers 316, 318 may move one toward the other when a board is present in between. The grippers 316, 318 grip or squeeze the side of the said board allowing the picking of the said board. When a board is squeezed between the gripper 316, 318, the movement of the grippers 316, 318 away from one another shall release the squeezed board. In the illustrated embodiment, the gripper 316, 318 are A-shaped and are slidingly connected to the body 330. The gripping assemblies 314 and grippers 316, 318 are generally made of a rigid material, such as metal or hard plastic.

In some embodiments, both gripping assemblies 314, or two grippers 316, 318, are moveable in relation of one toward the other. In other embodiments, one of the two gripping assembly 314 or of the grippers 316 or 318 may be moveable while the other gripping assembly 314 or gripper 318, 316 is static.

In yet other embodiments, the device 310 may comprise a gripping displacing system 320 controlling the movement and/or positioning of each of the gripping assemblies 314 or of the grippers 316, 318. The gripping displacing system 320 generally comprises a piston 326 adapted to push or pull on one of the gripping assemblies 314, thus creating a movement similar to a plier or a hand picking an object. The piston 326 is typically actuated through a pneumatic system. Understandably, any other known mean to displace the gripping assembly 314 are within the scope of the present invention.

The device 310 may further comprise a sliding mechanism 328, such as but not limited to a slider or a rail, for macro adjustments of the distance between the two gripping assemblies 314. As such, the adjustment of the distance between the two gripping assemblies 314 may be maintained by a locking system, such as a pneumatic piston or brake being activated or released. The macro adjustments generally aim at allowing the device 310 to be used with boards having different dimensions. Typically, the said adjustments will be performed prior to starting production with boards having a predetermined width. Generally, the width between the gripping assemblies 314 shall be larger than the width of the processed boards to allow squeezing the side of the said boars. As an example, a rail, not shown, may be installed within reach of the robotized arm 300 allowing the robotized arm 300 to contact one of the gripping assemblies 314 with the rail and to push or pull on the said gripping assembly 314 to move the said gripping assembly 314 toward or away of the second gripping assembly 314. Understandably, any other means or mechanism to adjust the device 310 to different width of the boards being processed are within the scope of the present invention.

Furthermore, any other means of controlling the movement and placement of the gripping assemblies 314 or grippers 316, 318 may be used. It may be appreciated that the allowed macro adjustments of the width between the gripping assemblies 314 allows the device to pick any specific sizes and shapes of board.

The device 310 further comprises one or more first prehension member 322 and one or more second prehension member 323. The first prehension member 322 typically comprises a side surface 324 adapted to receive and mate with a first side of the boards. The second prehension member 323 comprises a second side surface 325 adapted to receive and mate with a second side of the boards. In a typical embodiment, the first side surface 324 is a protuberance, curved or V-shape surface adapted to mate with the first side surface of the board. The first side surface of the board is typically a slot or a groove. The second side surface 325 is typically a recess or groove adapted to mate with the second side surface of the board. The second side surface of the board is typically a protuberance or ridge fitting in the groove of the first side surface of the board. The shape of the prehension members 322 and 323 thus have surfaces mating with the side surfaces of the boards, generally aiming at stabilizing the picking and manipulation of the boards.

In other embodiments, the prehension members 322 and 323 may have any other shape, such as being flat. It may further be appreciated that by having prehension members 322, 323 picking the boards on the sides rather than on the top or bottom, putty or any other type of coating that has been applied to the boards may be unaffected on the said top and bottom surfaces. Specifically in flooring, the top and bottoms surfaces are the surfaces that may be visible to the clients in the finished product, thus such surfaces shall not be compromised when manipulating the processed boards.

The prehension members 322 and 323 are generally made of semi-rigid or rigid material. In some embodiments, the prehension members 322 and 323 may be coated or may comprise a protecting layer aiming at limiting damages to the picked up and released boards.

Figure 6:
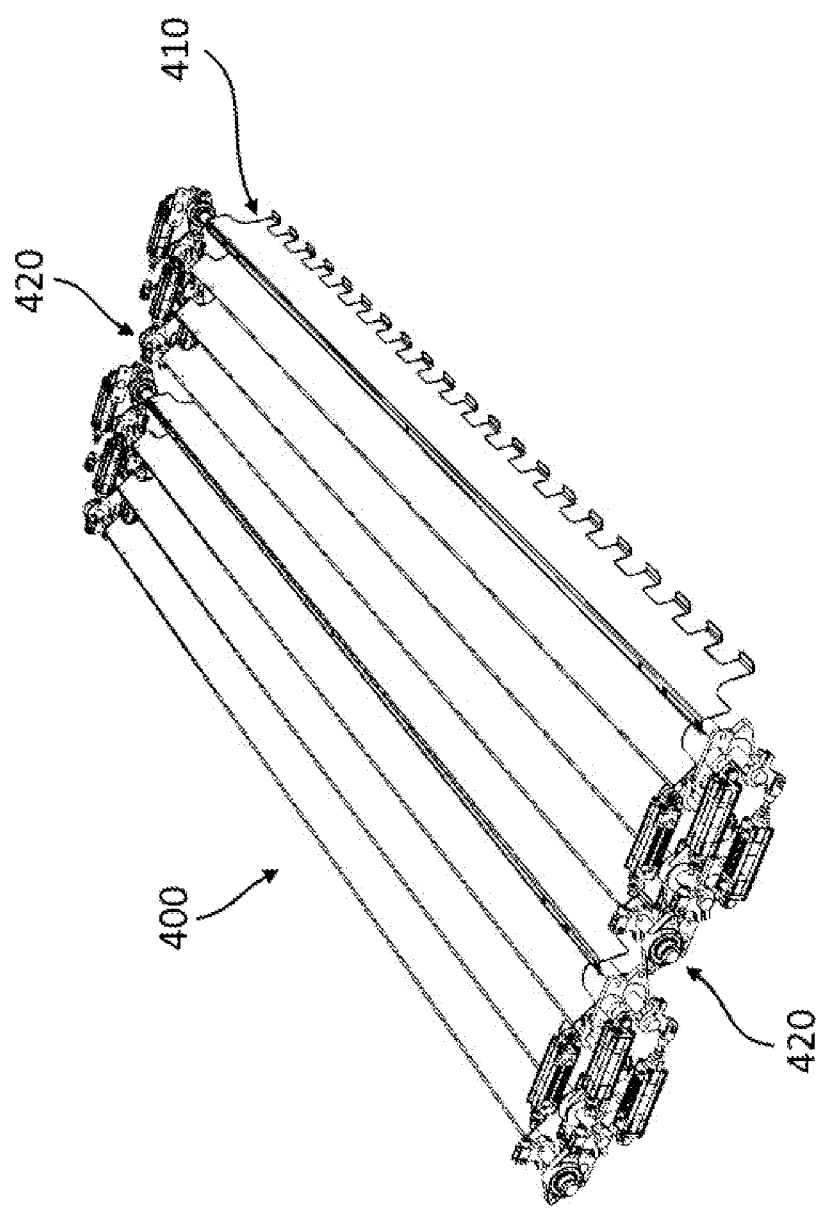
FIG. 6 is a perspective view of an embodiment of a combining system of the sorting and combining system of FIG. 1.
Figure 7:
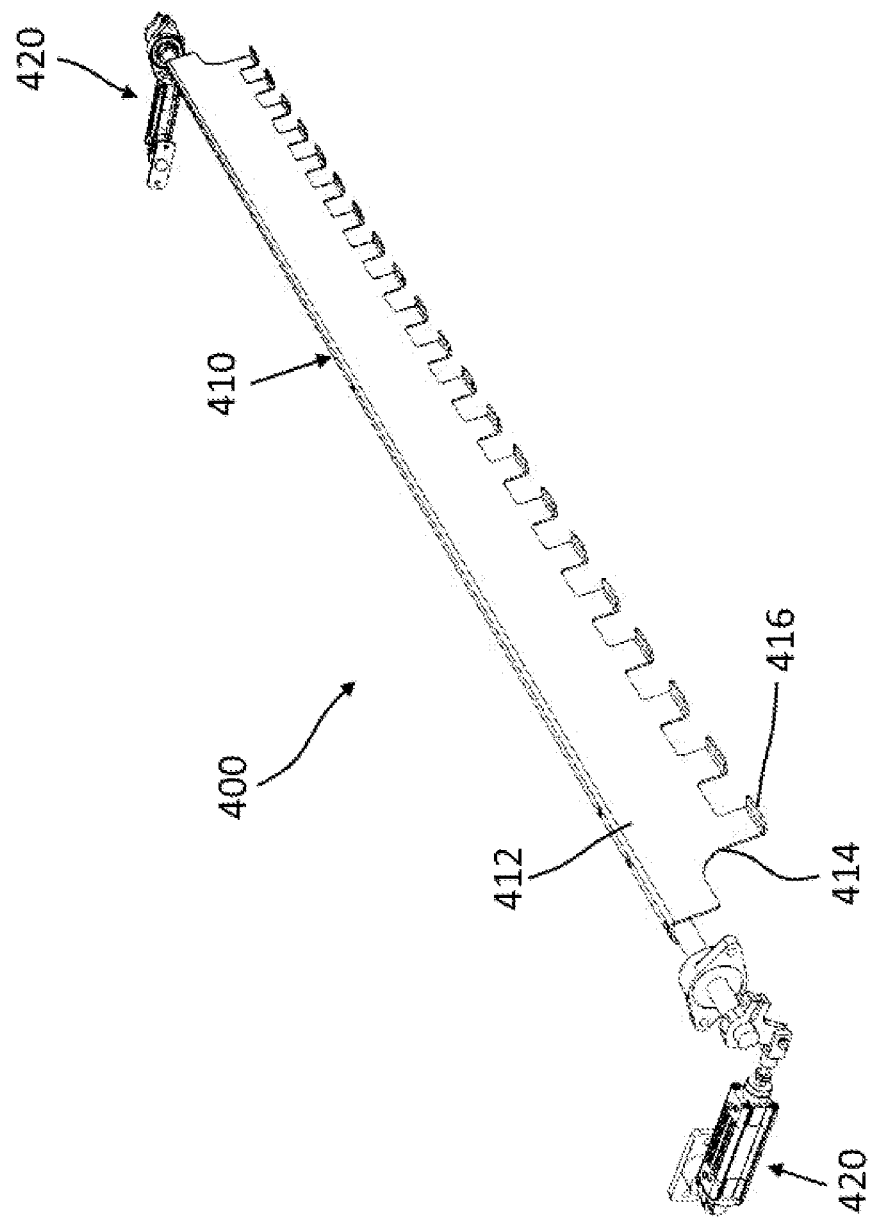
FIG. 7 is a partial perspective view of the main combining system of FIG. 6.

Now referring back to FIGS. 6 and 7, an embodiment of a combining system 400 is illustrated. The combining system 400 comprises a plurality of adjacent rows 410 adapted to receive one or more boards.

The system 1000 further comprises at least a combining system 400 generally installed downstream from the robotic arm 300. The combining system 400 is located within the range of reach of the robotic arm 300. The combining system 400 comprises a predetermined number of adjacent rows 410. The number of rows 410 may vary based on the range of the related robotic arm 300 and/or as a function of the speed of the conveyor 300. In the illustrated embodiment, the combining system 400 comprises 8 adjacent rows 410.

In embodiments comprising more than one robotic arm 300, the system 1000 comprises a plurality of combining systems 400, typically one combining system 400 for each robotic arm 300.

The combining system 400 is generally suspended or extending over the conveyor 200. In such embodiments, the combining system 400 must be raised at a certain distance above the conveyor 200 to not impede movement of the boards on the conveyor 200.

In some embodiments, each of the rows 410 comprise a support element 412 along the width of the combining system 400. The supporting element 412 is typically at an angle in relation to the top surface of the conveyor 300, generally aiming at easing the robotic arm 300 to dispose the picked boards on the support member 412. The rows 410 are generally pivotable around an axis substantially parallel to the width of the conveyor 200. Pivoting the row 410 allows any board present of the said row 410 to be released on the conveyor 200.

In some embodiments, the geometry and placement of the embodied accumulating (or combining) rows 410 may be adapted for the boards to be directly placed on the conveyor 200 without a significant impact. In some embodiments, the supporting element 412 is adapted to pivot about an axis substantially perpendicular to the length of the conveyor 200. The rows 410 may pivot downwardly toward the conveyor 200. In yet other embodiments, the supporting element 412 comprises tabs or protuberances 414 and/or lips 416 adapted to stop sliding of the board. The tabs 414 are shaped to pass between two adjacent conveyor bands 200. As the supporting element 412 pivots, the board supported by the row 410 slowly slides toward the conveyor bands 200. In such embodiment, the supporting element 412 having tabs 414 generally aims at limiting the bouncing, impact, mispositioning and/or breaking of the boards when they reach the conveyor 200 as the boards are advantageously disposed on said conveyor 200.

As discussed above, in some embodiments, the rows 410 comprise of a generally flat support member or platform 412. The support member 412 may further comprise a plurality of tabs 414 along the width of the member 412 at the extremity being opposite to the pivot axis. The tabs 414 may further comprise a section 416 substantially perpendicular to the supporting member 412. Such embodiment generally aims at securing or maintaining the boards on the rows 410.

In such embodiment, when a row 410 comprises boards having a total combined length within a predetermined length range, the row 410 comprising the said boards releases the boards on the conveyor. In some embodiments, the controller activates pivoting of the row 410 toward the conveyor 200. The pivoting moves the boards of the completed row 410 toward the exit or outfeed module 600 of the system 1000.

In some embodiments, the flat platform 412 may be pivotable. As such the flat platform may pivot over the conveyor 200. Such pivoting movement moves the tabs 414 between each endless band 224 of the conveyor 200. The tabs 414 typically create a slope or slanted surface. As such, the boards present on the row 410 slide to the top surface of the conveyor 200. Any device known in the art to control rotation 420 may be used to control the pivoting of the combining rows 410, such as but not limited to servomotors. Understandably, any other means or method to release or move the boards on the conveyor 200 may be used within the scope of the present invention.

Figure 8:
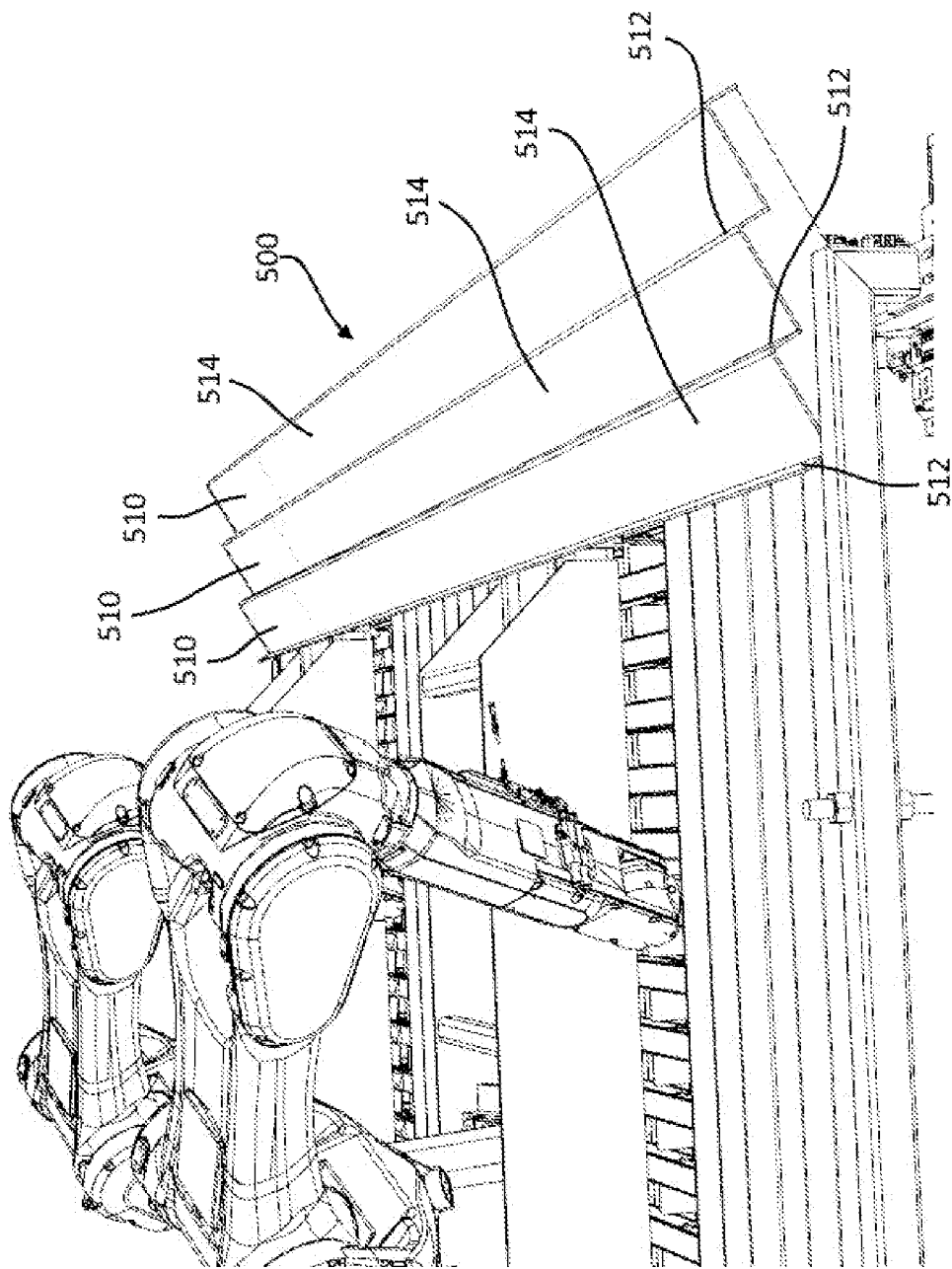
FIG. 8 is a perspective view of an additional combining system of the sorting and combining system of FIG. 1.

Now referring to FIG. 8, the illustrated system 1000 comprises two robotized arms 300 and a supplemental combining system 500, also referred to as side combining system or reserve. The supplemental combining system 500 is typically located on one side of the conveyor 200. The supplemental combining system 500 generally comprises a plurality of supplemental or reserve rows 510. In some embodiments, each reserve row 510 is at an angle allowing a board to remain on the row 510, at least by gravity. In such an embodiment, each one of the rows 510 comprises a bottom lateral wall 512 acting as a stopper for the board received by the row 510. The supplemental combining system 500 is typically fixed to the frame 10. The supplemental combining system 500 may be located at any position on the main frame 10, as long as and the supplemental combining system 500 is within range of the reach of the robotic arms 300. In a preferred embodiment, the supplemental combining system 500 is located along the side of the conveyor 200. As explained above, the surface 514 of each row 510 receiving the boards may be even or angled. In the illustrated embodiment, the top surface 514 of each row 510 is slightly angled, which may help the robotic arms 300 in accessing boards on said row 510. In the illustrated embodiment, the supplemental combining system 500 comprises three rows 510. Understandably, in other embodiments, the side combining system 500 may comprise a different number of rows 510 adapted to the conditions of operations of the system 1000.

Figure 9:
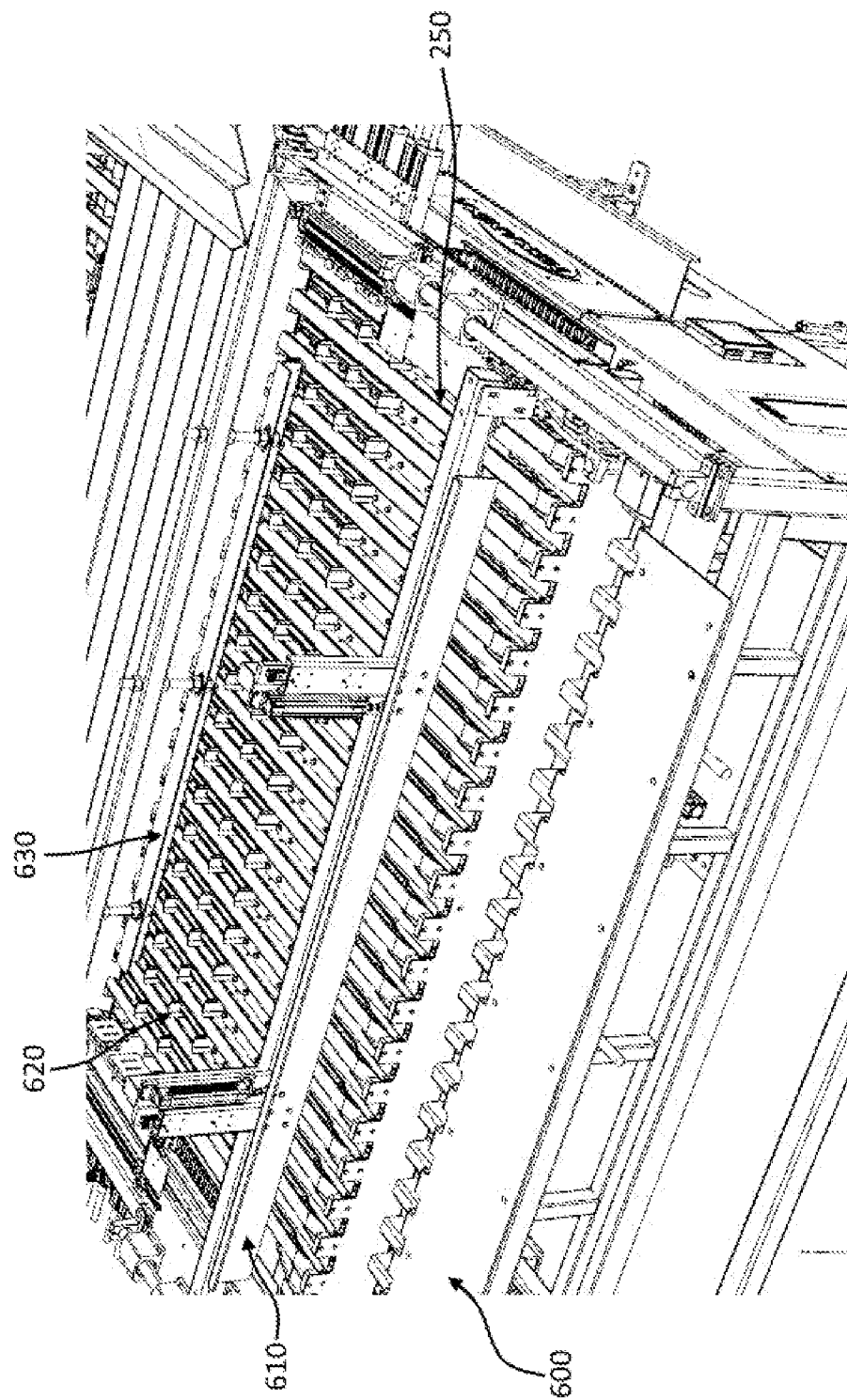
FIG. 9 is a top perspective view of an outfeed system of the sorting and combining system of FIG. 1.

Referring now to FIG. 9, a partial view of the system 1000 illustrates an optional outfeed system 600. The outfeed system is typically located at a second extremity of the conveyor 200 or at an exit area 250. The outfeed system 600 is generally adapted to receive boards moving on the conveyor 200. Generally, a plurality of boards having a combined length less but typically close to a predetermined length of a packaging are being moved toward the outfeed system 600. One skilled in the art shall understand that the predetermined length may have a convenient error margin so as to allow a realistic outflow of stacks of boards. The outfeed system 600 may comprise a combining mechanism 610 adapted to press each board of a stack against other boards of the same stack to reduce the combined length. The outfeed system 600 may comprise a stopping system 620 adapted to stop the boards moving on the conveyor. In yet other embodiments, the outfeed system 600 may further comprise a stacking system 630 adapted to stack a plurality of combined boards on top of other combined boards of the same length. Both this vertical and horizontal stacking may improve the packaging and transportation of the resulting stacks.

The apparatus 1000 may further comprise a controller or processing system (not shown), such as a central controller, a computer, a programmable automate or any other type of computerized device. In some embodiments, the controller comprises a processor, a memory unit at least for storing instructions to be executed and a storage unit. The controller may be located in the system 1000, such as in the robotized arm 300 or be in communication with the system 1000. Understandably, the controller may be embodied as a plurality of computerized devices or a central computing system configured to execute the same instructions.

The controller generally aims at sending requests to the robotized arm 300, storing the status of the combining systems 400 and/or 500 and/or computing in real-time the status or flow of the system 1000. Based on the computed status, the controller determines the movement or action to be executed by the robotized arm. The controller is in signal communication with different components of the system 1000, such as but not limited to the robotized arm 300, the sensors 240, the stopping system 230, the motor of the conveyor 200, the triggering system of the supplemental combining system 500 or any other component being automated. As an example, the controller may be configured to communicate a request the position the robotic arms, the notify the presence of a board piece at a sensor, etc.

In some embodiments, the controller is configured to execute instructions of a program, the program being configured to use the information for the different components in signal communication with the controller to retrieve, analyse and process the status of each of the components of the apparatus 1000. Accordingly, the controller may be configured to communicate instructions or request to one or many components of the apparatus 1000 to sort and combine board pieces of a predetermined length based on the real-time analysis performed. In a fully automated mode, the controller is configured to limit the human interaction required to operate the system 1000. In a manual mode, the controller may be configured to receive input from a user or from an interface to manually control the system. The manual mode is typically used in a context of debugging or testing the system 1000. In another example, a user may send an instruction to completely stop the apparatus 1000 if an error occurs so as to avoid any damage or accident.

The controller may be in communication through a network. As such, the controller may comprise a networking unit, such as an ethernet card, a Wi-Fi or Bluetooth™ transmitter, to communicate data over a network. In such an embodiment, each of the components of the system 1000 is in communication with the network.

Figure 10A:
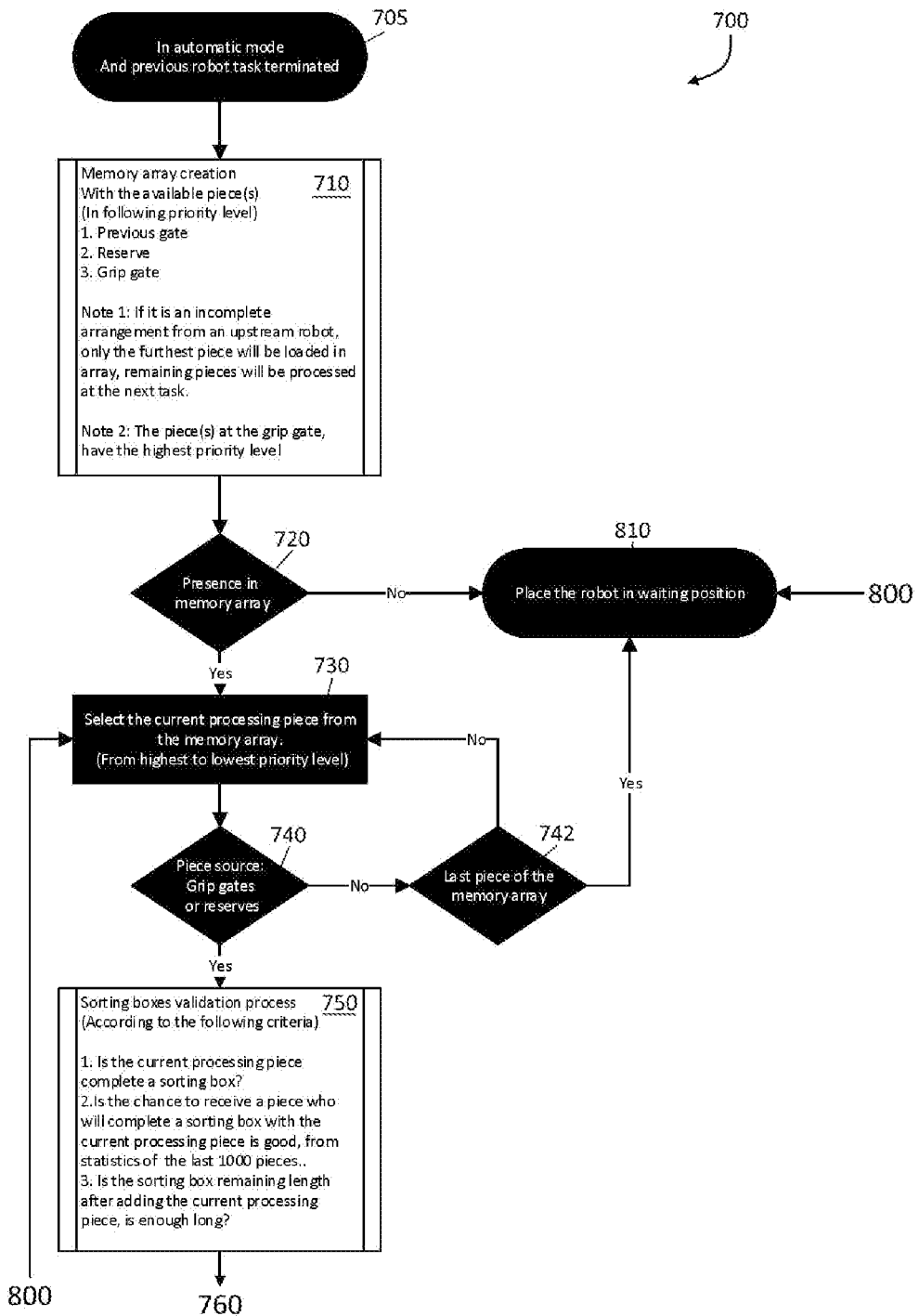
FIG. 10A is a first part of a workflow diagram of a method for automatically sorting board pieces in accordance with the principles of the present invention.
Figure 10B:
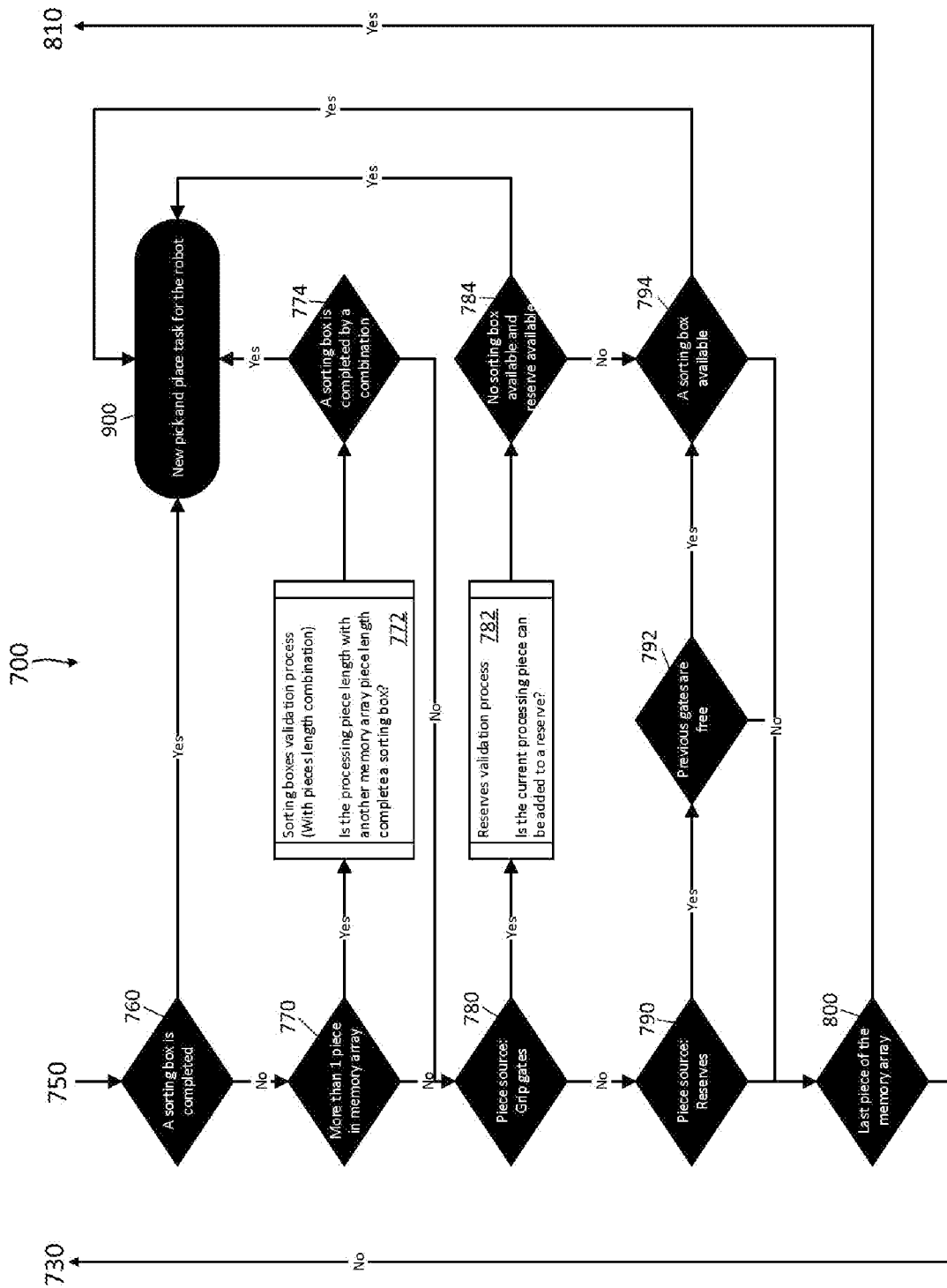
FIG. 10B is a second part of the workflow diagram of FIG. 10A.

Referring now to FIGS. 10A and 10B, a method for the combining and sorting of arrangement arrays of board pieces 700 is illustrated. The method, while not limited, may use conveying and sorting devices as above described and determines decisions and/or action to be executed to combine and sort boards using one or more robotic arms.

As discussed above, the system 1000, or the robotic arm 300 may be operated in an automatic mode. The automatic mode generally processes in real-time an influx of boards moving in the reach of a robotic arm 300.

The method for automatically combining and sorting arrangement arrays of boards generally comprises waiting for any previous task to be completed 700 before performing a new task or other steps. The method 700 is typically implemented by the controller in communication with the different subsystems of the system 1000, such as the one or more robotic arms 300.

The method comprises, for each robotic arm 300, creating a memory array 710 having a size adapted for the combining system 400 and/or the supplemental combining system 500. The created memory array is adapted to store presence of any board piece located at a previous gate, in a reserve or at a grip gate within the reach of the associated robotic arm 300. The priority for sorting said pieces may, from highest to lowest, start by the grip gate, then the reserve and next the previous gate. Understandably, other priority order may be implemented for different conditions. Indeed, allocating a sorting priority for board pieces located at different locations on the device may allow for more efficient sorting by reducing the congestion of boards on the conveying device as much as possible, generally aiming at reducing any possible downtime. In some embodiments having two robotic arms 300, in the event where the robotic arm 300 receives an incomplete arrangement array from an upstream robotic arm 300 or directly from the infeed module, the downstream robotic arm 300 may only load the physically furthest piece from said arrangement array into the array of the downstream robotic arm 300. In such an event, the remaining pieces of the incoming arrangement array shall be processed at a subsequent task.

The method 700 further comprises detecting or identifying presence of a board piece in the memory array 720. When at least one board piece is present in the memory array, the method 700 comprises selecting the board pieced to be processed in the memory array 730.

The method of the robotic arm first check if the source of the piece 740 is a combining system 400 or 500. In embodiments having a supplemental combining system 500 or more than one combining system 400, the source may be selected between the combining system 400 and the supplemental combining system 500.

If the source of the piece is not from a combining system 400 or 500, the method 700 check if the board piece is the last piece in the memory array 742. If the board piece is the last piece, then the robotic arm 300 is placed in a waiting position 810 until more board pieces enter the memory array 720. If the board piece is not the last piece, then the method 700 comprises selecting another board piece from the memory array 730.

As such, the method 700 may further comprise validating to sort the at least one board piece on a row 410 of the combining system 400 to complete an arrangement array 750. The validation process 750 typically uses the selected board piece as a reference. The validation process 750 generally analyses if said piece is completing a row 410. The validation process 750 generally comprises computing the probability to complete a row 410 with the selected piece. Such computing is typically based on statistics of previously selected pieces and if the remaining length to complete the row 410 is long enough to add another piece if said selected piece is added. If the computed probability if higher than a predetermined level, then the selected piece is accordingly placed on the row 410.

The method further comprises checking if the row 410 is completed 760. If the row is completed, the method 700 comprises picking another board piece 900 from the conveyor 200 or from one of the supplemental combining systems 500.

If the row 410 or sorting box is not completed or if the computed probability level is lower than a predetermined level, the method 700 comprises checking if more than one board piece is present in the memory array 770. If there are more than one piece in the memory array, the method 700 may comprise another validation process 772. The validation process 772 generally analyses if the processed piece length would complete another row 410 or sorting box when combined to another board of the memory array. The validation process 772 typically iterates through all the possible rows 710 to check if one can be completed. If the length of the combined boards would complete a row 774, the method 700 requests the robotic arm 300 to pick up another board piece 900 from the conveyor 200 or the supplemental combining system 500.

If a sorting box is not completed or if there are not more than one piece in the memory array, the method 700 comprises checking if the piece source is on the conveyor 200, 780. In embodiments comprising a supplemental combining system 500, if the piece is located on the conveyor 200, the method 700 may comprise performing validation process to check if the piece should be placed in the reserve or supplemental combining system 500, 782. In such embodiments, the method 700 further comprises checking if reserve is available 784 in the event that no sorting box is available. If the reserve 500 comprises an available spot, the method 700 further comprises moving the robotic arm 300 toward the reserve 500 and releasing the board piece at one of the available positions in the reserve 500. The method 700 then picks a new board piece 900. If there is space on a combining system 400, the method 700 comprises adding the selected piece to a row 410 of the combining system 400 794 and picking a new board piece 900. If there is no space in the reserve and in any of the sorting box, the device verifies if there is only one piece left in the memory array 800. If the said piece is the last piece in the memory array, the robotic arm 200 is placed into waiting mode 810. If another piece is present in the memory array, the method 700 selects the next current board piece 730.

If there are no board piece located at a grip gate of the conveyor 200, 780, the method 700 comprises checking if a board piece is present on the reserve 500, 790. If at least one board piece is present on the reserve 500, the method 700 comprises checking if the previous gates are free of pieces 792. If the gates are free and the sorting box 410 is available 794, then the piece from the reserve is added to an available sorting box. If the previous gates have at least one piece, the method 700 checks that there is only one piece left in the memory array 800. If a sorting box is not available, the method 700 checks if there is only one piece left in the memory array 800. If there are no board piece on the reserve, the method 700 checks if there is only one piece left in the memory array 800.

If there are more than one board piece in the memory array, then the method 700 reverts back to the step of selecting the current processed piece from the memory array 730, from highest to lowest priority level. If there is only one board piece in the memory array, then the robotic arm 300 is placed in a waiting position 810. The robot 300 may be left in a waiting position when new pieces enter the memory array, in which case the method restarts at step 720.

In another embodiment, the method may have the robotic arm exchange board pieces from an incomplete sorting box to another incomplete sorting box, the reserve or a grip gate.

In yet other embodiments using two robotic arms 300, a method to clear the combining rows of an upstream robotic arm 300 is provided. The method comprises triggering or identifying the end of a production or the end of new boards entering the conveyor 200. The method further comprises triggering the release of all of the boards or all the rows 410 present on the upstream combining system 400, such as releasing all rows at intervals. At such point, the remaining boards of the rows 410 of the upstream combining system 400 shall be incomplete. The downstream robotic arms 300 execute a sorting and combining method 700 to pick and process each of the incoming board on the conveyor 200. Such method of ending production generally allows giving a chance to sort and combine the pieces which would otherwise have been unused.

Understandably, in embodiments having supplemental combining system 500, the upstream robotic arm may be configured to also pick and release on the conveyor 200 all the boards remaining on such supplemental combining system 500 so such board pieces may be processed by the downstream robotic arm 300.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A system for sorting and combining board pieces, the system comprising:
    a conveying system for moving the board pieces;
    a board pieces length measuring system;
    a row building system comprising a plurality of row accumulating assemblies configured to receive the board pieces and move the received board pieces to the conveying system; and
    a robotic arm downstream of the board pieces length measuring system, the robotic arm being configured to:
        pick one or more of the board pieces on the conveying system;
        move the one or more picked board pieces to any position on one of the row accumulating assemblies of the row building system, the position on the row accumulating assembly being based on the length of the picked board pieces measured by the measuring system;
    wherein the board pieces present on one of the row accumulating assemblies combining are moved to the conveying system when a total length of the board pieces present on the row accumulating assembly corresponds or within a predetermined range to a predetermined length.

2. The system of claim 1, the row building system being above and across the conveying system.

3. The system of claim 1, the row accumulating assemblies being substantially parallel to one another and being substantially perpendicular to the conveying system.

4. The system of claim 1, the row accumulating assemblies comprising a plurality of tabs.

5. The system of claim 4, each of the tabs being distanced from the other tabs and wherein the tabs support the board pieces during movement of the rows.

6. The system of claim 4, the tabs being moveable under a top surface of the conveying system.

7. The system of claim 1, the system further comprising a frame over the conveying system, the robotic arm being attached to the frame.

8. The system of claim 1, the robotic arm being moveable along the width of the conveying system.

9. The system of claim 1, the robotic arm having a plurality of degrees of rotation to manipulate the board pieces present at heights and positions within reach of the robotic arm.

10. The system of claim 1, the robotic arm comprising a board gripper.

11. The system of claim 10, the board gripper being adapted to pick up the board piece from side surfaces of the said board piece.

12. The system of claim 1, the system further comprising a reserve accumulation system within reach of the robotic arm, the reserve accumulation system comprising a plurality of reserve rows.

13. The system of claim 12, the rows of the reserve accumulation system being at an angle.

14. The system of claim 12, the reserve accumulation system being on a longitudinal side of the system.

15. The system of claim 12, the robotic arm being configured to pick a board piece from the reserve accumulation system and to move the picked-up board piece to the row building system.

16. The system of claim 12, the reserve accumulation system being configured to prevent overflowing of the board pieces on the row building system.

17. The system of claim 1, the row building system being located downstream and within reach of the robotic arm.

18. The system of claim 1, the board pieces length measuring system further comprising sensors for measuring the length of the board pieces.

19. The system of claim 1, the system comprising a second robotic arm and a second row building system.

20. The system of claim 19, the second robotic arm and the second row building system being across the conveying system and being downstream from the first robotic arm.

21. The system of claim 1, the row building system being configured to move all the board pieces present on the row building system to the conveying system.

22. The system of claim 1, further comprising:
   a controller configured to control movements and manipulations of the robotic arm and trigger the release of board pieces from one of the row accumulating assemblies to the conveying system.

23. A method for sorting and combining board pieces, the method comprising:
   detecting length of a conveyed board piece;
   moving the detected board piece toward a robotized arm;
   using a robotized arm to pick the detected board piece;
   the robotic arm moving the picked board piece to a any position on one of accumulating rows based on the detected length and based on length of board pieces present on the accumulating row or absence of board pieces on the accumulating row;
   repeating the detection, picking and moving the picked board to form a row of boards having a predetermined length.

24. The method of claim 23, the method further comprising:
   releasing all of the stocked board pieces from the accumulating rows;
   using a second robotized arm to pick the released board pieces.

25. The method of claim 23, the method further comprising:
   storing the detected length of each board in a data structure stored in a memory representing the stocked rows of board pieces;
   using the data structure of the memory to determine a position in one of the rows to stock a picked board piece.

26. The method of claim 25, the method further comprising:
   computing a level of confidence to form rows of board pieces having the predetermined length using the detected length of the board pieces in the data structure of the memory;
   adding the picked board piece to a row having the computed level of confidence higher than or equal to a predetermined value;
   stocking the board pieces in the selected rows.

27. The method of claim 25, the method further comprising:
   allocating a priority for sorting each of the board pieces in the data structure of the memory based on the location of the stocked board pieces.

28. The method of claim 26, the method further comprising stocking the board pieces having the computed level of confidence lower than or equal to the predetermined value.

29. The method of claim 23, the method further comprising the robotic arm moving one of the stocked board pieces to another row of stocked board pieces.

* * * * *